US012452500B2

(12) United States Patent
Cogan

(10) Patent No.: US 12,452,500 B2
(45) Date of Patent: Oct. 21, 2025

(54) PERSONALIZED VIDEO MECHANISM

(71) Applicant: Douglas Neal Cogan, Boulder, CO (US)

(72) Inventor: Douglas Neal Cogan, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/608,531

(22) Filed: Mar. 18, 2024

(65) Prior Publication Data
US 2025/0294227 A1    Sep. 18, 2025

(51) Int. Cl.
| | |
|---|---|
| *H04N 21/854* | (2011.01) |
| *G06Q 30/0251* | (2023.01) |
| *G06T 11/60* | (2006.01) |
| *G11B 27/036* | (2006.01) |
| *H04N 21/431* | (2011.01) |
| *H04N 21/81* | (2011.01) |

(52) U.S. Cl.
CPC ....... *H04N 21/854* (2013.01); *G06Q 30/0271* (2013.01); *G06T 11/60* (2013.01); *G11B 27/036* (2013.01); *H04N 21/4316* (2013.01); *H04N 21/812* (2013.01); *G06T 2210/12* (2013.01)

(58) Field of Classification Search
CPC ............. H04N 21/854; H04N 21/4316; H04N 21/812; G06Q 30/0271; G06T 11/60; G06T 2210/12; G11B 27/036
See application file for complete search history.

(56) References Cited

U.S. PATENT DOCUMENTS

| | | |
|---|---|---|
| 8,949,889 B1 | 2/2015 | Erdmann |
| 9,277,198 B2 | 3/2016 | Fay et al. |
| 10,491,947 B1 | 11/2019 | Weisman et al. |
| 11,694,417 B2 | 7/2023 | Shaburov et al. |
| 2003/0028873 A1 | 2/2003 | Lemmons |
| 2004/0194128 A1 | 9/2004 | McIntyre et al. |

(Continued)

FOREIGN PATENT DOCUMENTS

| | | |
|---|---|---|
| FR | 2851874 A1 | 8/2005 |
| KR | 20080004220 A | 1/2008 |

OTHER PUBLICATIONS

"How do I create one video and send personalized videos to multiple prospects?", Hippo Video, pp. 1-9, downloaded Jan. 21, 2024 from https://www.hippovideo.io/blog/how-do-i-create-one-video-and-send-personalized-videos-to-multiple-prospects/amp/.

(Continued)

*Primary Examiner* — Thai Q Tran
*Assistant Examiner* — Jose M Mesa
(74) *Attorney, Agent, or Firm* — Jaffery Watson Hamilton & DeSanctis LLP

(57) ABSTRACT

A system is described. The system includes at least one physical memory device to store a content editor and one or more processors coupled with the at least one physical memory device to execute the content editor to receive a selection of a video frame of a background video file displayed within in a graphical user interface (GUI), generate one or more personalization elements indicating personalized data that is to appear in a reference video associated with the background video file, apply the one or more personalization elements to the selected video frame and generate a design file including the one or more personalization elements.

20 Claims, 16 Drawing Sheets

(56) References Cited

U.S. PATENT DOCUMENTS

| | | | |
|---|---|---|---|
| 2006/0008177 | A1 | 1/2006 | Chermont et al. |
| 2014/0043363 | A1 | 2/2014 | Bala et al. |
| 2014/0337881 | A1 | 11/2014 | Huang et al. |
| 2016/0142792 | A1 | 5/2016 | Lee et al. |
| 2020/0234483 | A1* | 7/2020 | Mashrabov ............. H04L 51/10 |
| 2021/0303826 | A1* | 9/2021 | Voss ................. H04N 21/41407 |
| 2021/0390710 | A1 | 12/2021 | Zhang et al. |
| 2022/0207812 | A1 | 6/2022 | Mashrabov et al. |
| 2022/0210497 | A1 | 6/2022 | Lyons et al. |
| 2022/0377257 | A1* | 11/2022 | Wilson ..................... G06N 3/08 |
| 2024/0211994 | A1 | 6/2024 | Biswas et al. |
| 2024/0386750 | A1* | 11/2024 | Boskovich ............. G06V 20/64 |

OTHER PUBLICATIONS

Partial European Search Report for EP Application No. 25162958.0, mailed Jul. 29, 2025, 15 pages.

Office Action for U.S. Appl. No. 18/608,419 mailed Jun. 16, 2025, 12 pages.

* cited by examiner

PERSONALIZED VIDEO MECHANISM

FIELD

This invention relates generally to personalized video. More particularly, the invention relates to generating video streams having personalized image elements within a video stream.

BACKGROUND

Video streaming services are adding more video advertising to generate additional revenue streams. However, these advertisements are not tailored to the customer in a specific way. Thus, there is a market desire for videos that are highly personalized for each individual viewer in order to demand a premium from an advertiser to be paid to the streaming service.

SUMMARY

In one embodiment, a system is disclosed. The system includes at least one physical memory device to store a content editor and one or more processors coupled with the at least one physical memory device to execute the content editor to receive a selection of a video frame of a background video file displayed within in a graphical user interface (GUI), generate one or more personalization elements indicating personalized data that is to appear in a reference video associated with the background video file, apply the one or more personalization elements to the selected video frame and generate a design file including the one or more personalization elements.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

As discussed above, there is a market to personalize video advertising provided by video streaming services. Particularly, there are available opportunities for personalized video as the need for personalized advertisements on websites, video display sites and consumer creation of personalized video are growing exponentially. Currently there are design tools implemented to generate personalized images by importing a static image and applying a personalized messages into the image. However, this idea has not been implemented in streaming video.

According to one embodiment, a mechanism is provided to incorporate personalized messages into a video stream. In such an embodiment, a frame of video is captured for a background for one or more personalized images and embedded into the video by applying video transitions to subsequent frames.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model," "interface," and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1A:
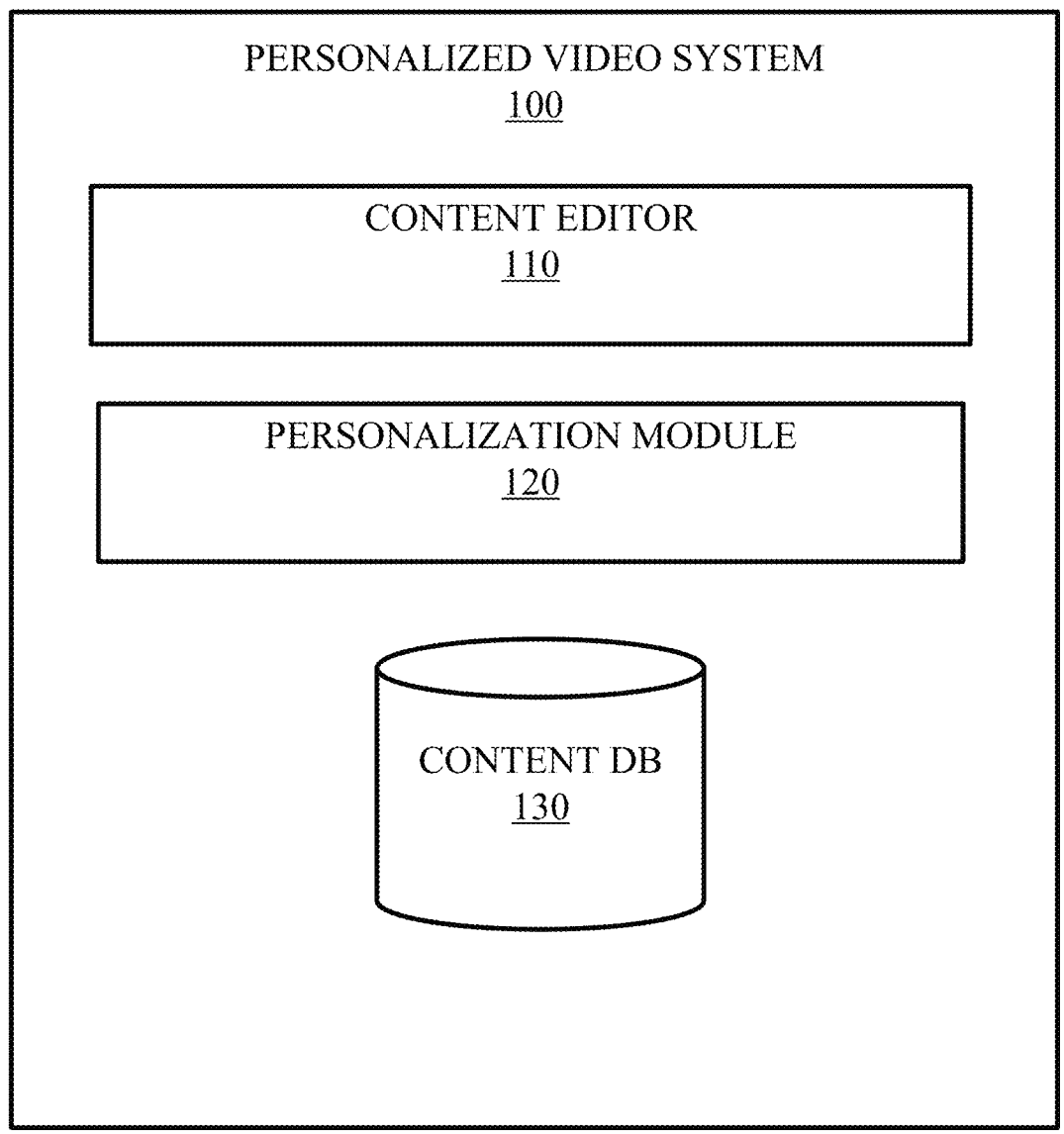
FIGS. 1A & 1B illustrate embodiments of a personalized video system.
Figure 1B:
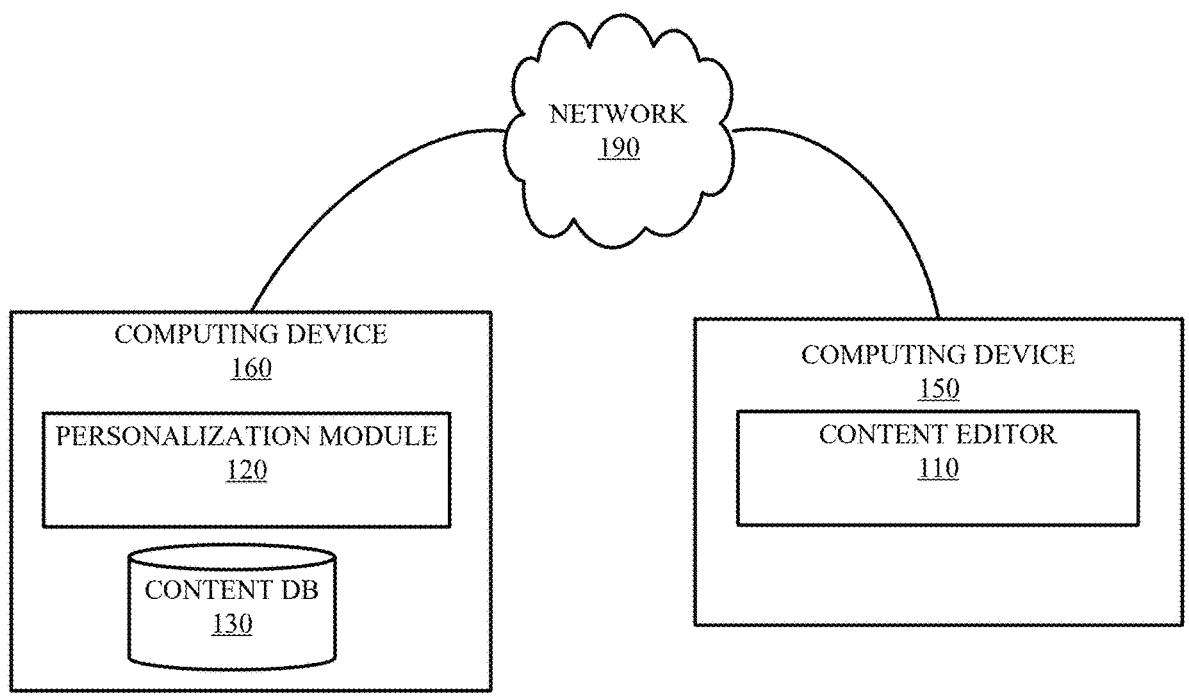

FIG. 1A illustrates one embodiment of a personalized video system 100 including a content editor 110, a personalization module 120 and a content database 130. Although shown as components within a single system 100, other embodiments may feature personalized video system 100 components included within independent devices communicably coupled via a network. For instance, FIG. 1B illustrates an embodiment in which personalized video system 100 components are implemented in a network. As shown in FIG. 1B, content editor 110 is included within a computing system 150, while personalization module 120 and content database 130 are included in a computing device 160 coupled to computing system 150 via a cloud network 190. However in other embodiments, computing systems 150 and 160 may be coupled via other types of networks (e.g., local area network).

In one embodiment, content editor 110 is implemented as a design tool to apply formatting to one or more sets of video frames within streaming video by tagging the frames with personalization elements and generate a design file including the personalization elements. Personalization elements may include static elements (e.g., background images) or dynamic elements (e.g., areas on the frame where variable (or personalized data) will appear in the video. Personalized data comprises variable content data that is customized to an individual viewing the video at a client system (not shown). For example, content viewed by a first individual viewer is different than content viewed by a second individual viewer. In one embodiment, the design file comprises a FlashPix file. A FlashPix file comprises a bitmapped computer graphics file format where the image is saved in more than one resolution.

Figure 2:
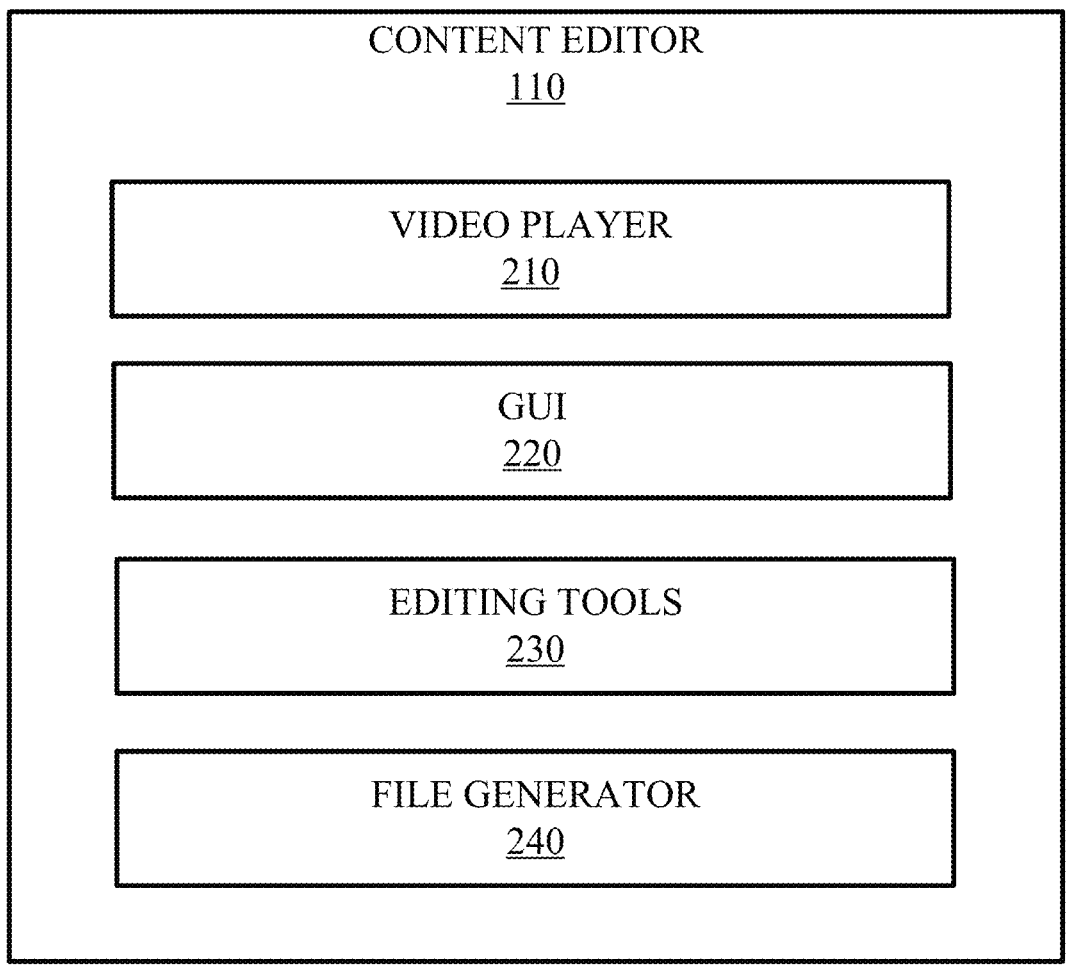
FIG. 2 illustrates one embodiment of a content editor.
Figure 3A:
FIG. 3A illustrates one embodiment of an image.

FIG. 2 illustrates one embodiment of content editor 110. As shown in FIG. 2, content editor 110 includes a video player 210 that is implemented to receive and open and play a background video file (e.g., a MPEG-4 (MP4) file) from which the one or more video frames are to be edited. In one embodiment, streaming video from the background video file is played within a graphical user interface (GUI) 220 and is edited using editing tools 230 to apply personalization elements to frames of the video. One type of tool implemented includes a scroll tool to facilitate scrolling through a video to determine a frame at which personalized data is to be displayed Using a beach video scene as an example in which waves crash onto a beach temporarily hiding sand on a shoreline, the scroll tool may be implemented to scroll through the video to identify frames that best suit the displaying of personalized data. FIG. 3A illustrates one embodiment of an image from a beach video frame. In this example, a message including personalized data (or a personalized message) is to appear written in the sand when the wave recedes and is hidden when another wave appears. Other personalized messages may be shown each time the wave recedes.

Figure 3B:
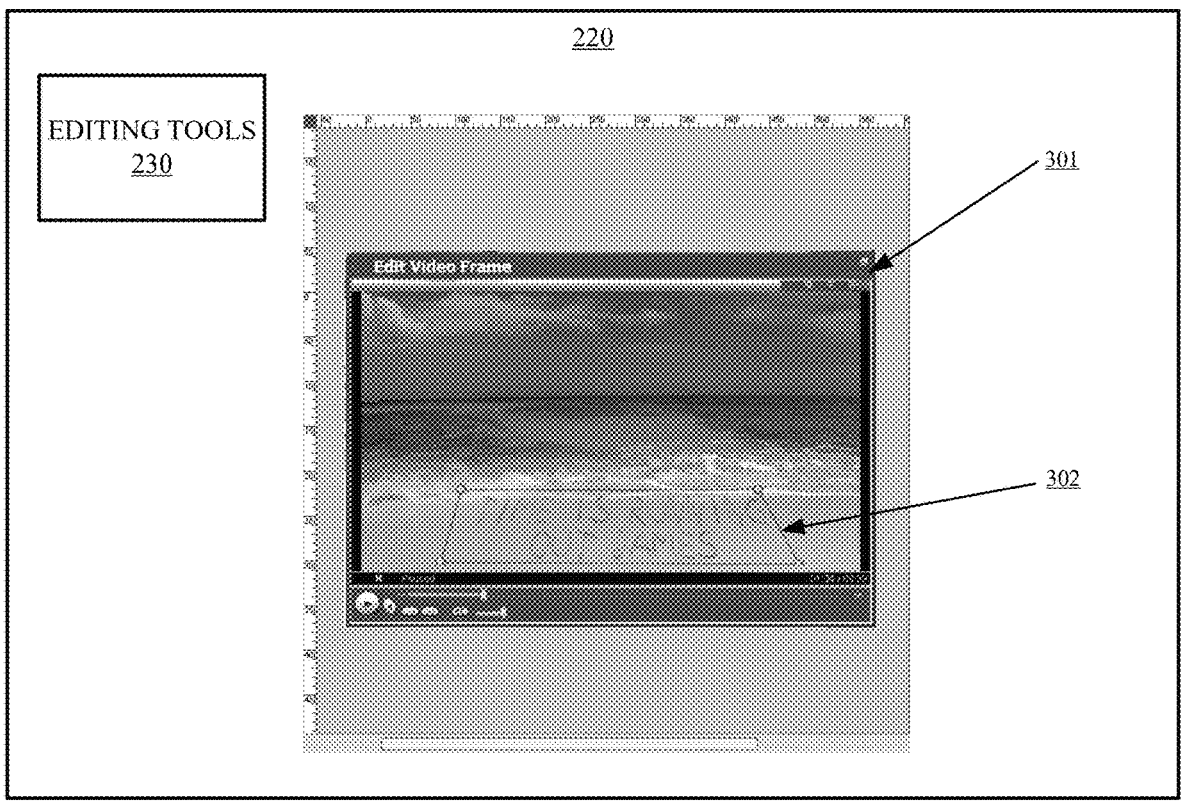
FIG. 3B illustrates one embodiment of a graphical user interface.

Another tool that is implemented is a drawing tool to insert image layer personalization elements (or personalized image layer) to selected frames. In one embodiment, a personalized image layer comprises a box indicating a boundary within a frame (or boundary box) at which personalized data is to be inserted. FIG. 3B illustrates one embodiment of GUI 220 having editing tools 230 and an edited video frame 301. As shown in FIG. 3B, video frame 301 includes a personalized image layer 302 having a sample personalized message. The personalization layer includes a variety of attributes indicating how the personalization is to be applied. In one embodiment, the system has the ability to apply an emboss effect to the background, or apply a font as if it is drawn across the image. Another option is that the personalization text can define a mask that will strip away the pixels of the video to reveal an image representing what is behind. In this example, the personalization specifies an image whose contents are revealed where the personalization text will appear. This will have the effect as if a person printed their name on a foggy window, revealing content behind it. The personalization can also be invoked by drawing the text with shapes, following the shape of the letters, such as text written in pebbles in the sand or jellybeans on a table. The personalization can also take the form of magnetic letters on a refrigerator spelling out text, or wisps of clouds spelling out text.

A time stamp tool is implemented to create time stamp personalization elements in the video to indicate start and stop times at which the personalized data is to be generated and hidden, respectively. The time stamps enable personalization module 120 to automatically detect when the personalized data within the image layer personalization element on which the video is drawn is obscured and hide the portion that is hidden. This allows the wave to wash over the writing, hiding just the top of the writing until all of the text is obscured, at which time the text can be changed to something else. In one embodiment, a personalization effects tool may also be implemented to add personalized effect personalization elements to be applied to the personalized data in the frame. For example, the personalized message may be written with a font to appear as if the text is carved into the sand and changes the color.

File generator 240 is implemented to generate a design file including all personalization elements that are applied to the video at personalization module 120. In one embodiment, the design file comprises instructions as to how personalized data is to be applied to a referenced video. In such an embodiment, the design file includes a reference to the video on which the design file is to be applied. However, in other embodiments the video may be included within the design file.

Figure 4:
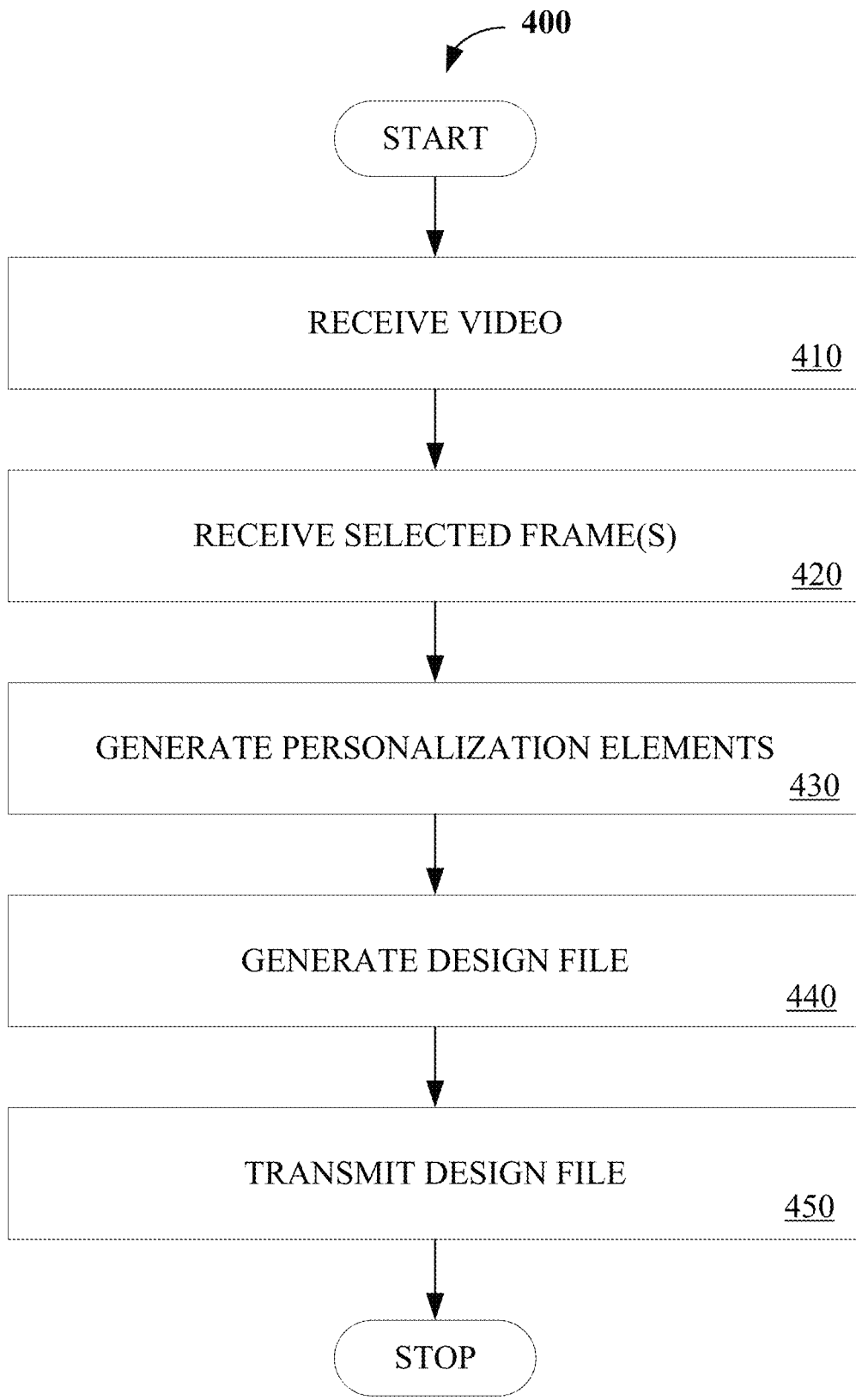
FIG. 4 is a flow diagram illustrating one embodiment of an editing process.

FIG. 4 is a flow diagram illustrating one embodiment of an editing process 400. Process 400 may be performed by processing logic that may comprise hardware (e.g., circuitry, dedicated logic, programmable logic, etc.), software (such as instructions run on a processing device), or a combination thereof. In one embodiment, process 400 may be performed by content editor 110. The process 400 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-3 are not discussed or repeated here.

At processing block 410, a background video file including a streaming video to be edited is received. At processing block 420, one or more frames selected for editing are received. At processing block 430, personalization elements are generated. As discussed above, the generated personalization elements (e.g., image layer, time stamp, personalization effects, etc.) are applied to the selected video frames. At processing block 440, a design file is generated that includes the personalization elements. At processing block 450, the design file is transmitted (e.g., either to personalization module 120 or content database 130).

Figure 5:
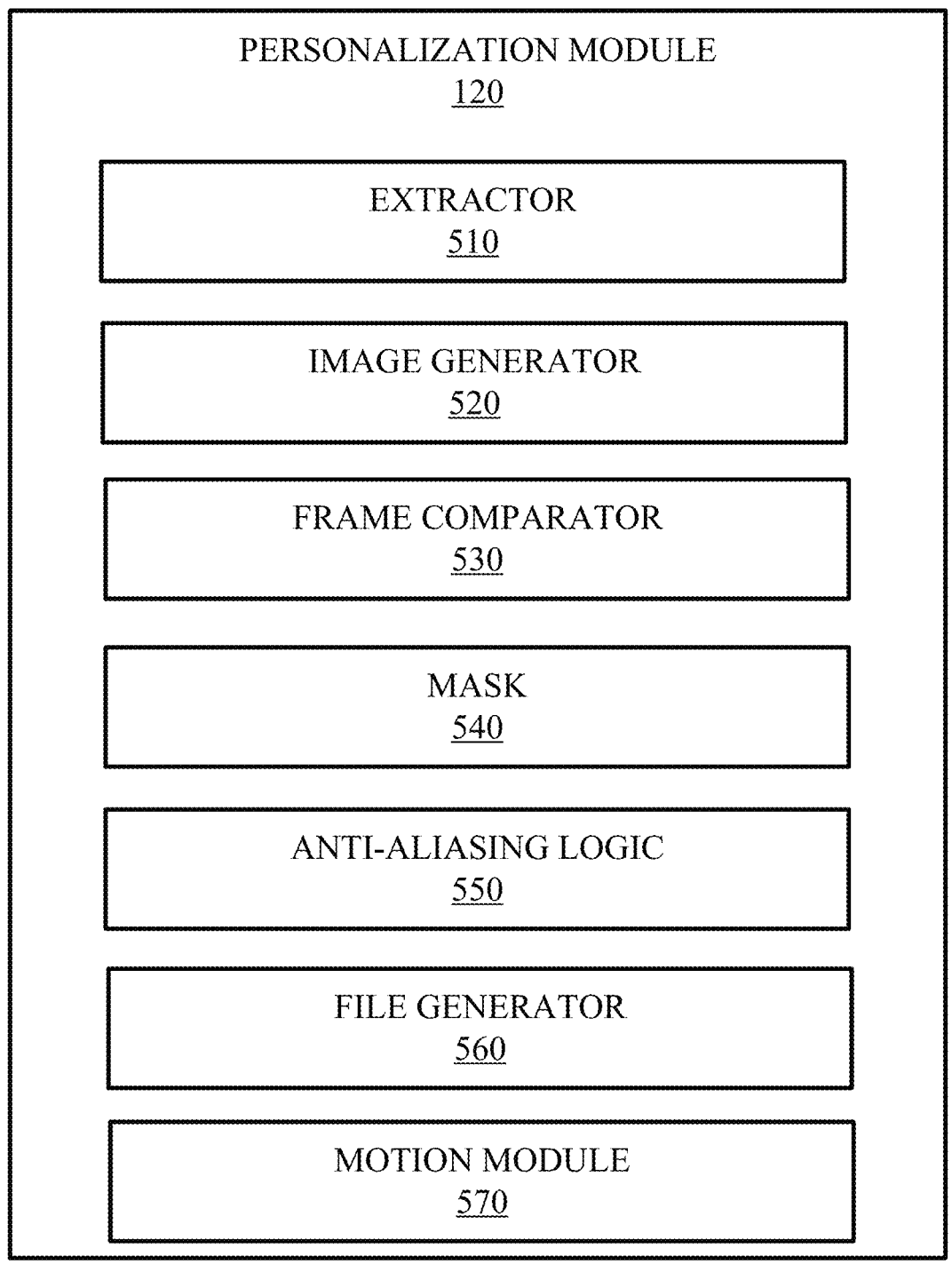
FIG. 5 illustrates one embodiment of a personalization module.
Figure 6A:
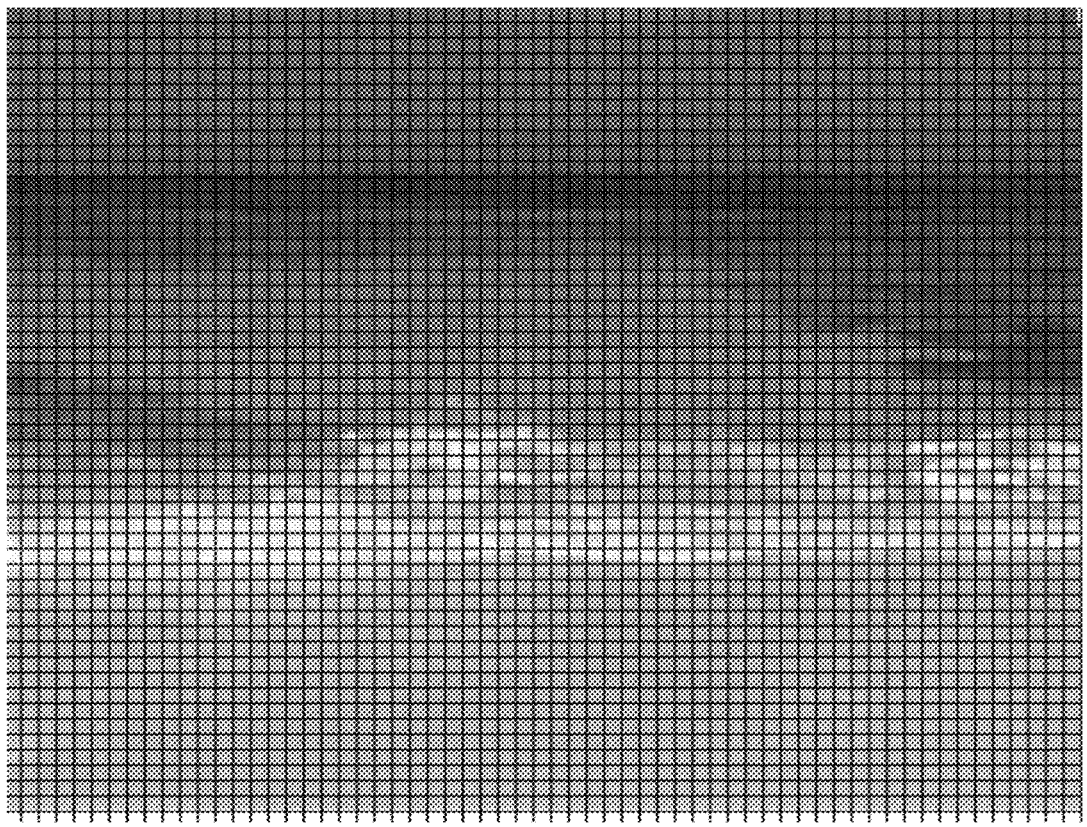
FIGS. 6A & 6B illustrate embodiments of image frames.

Personalization module 120 is a video processing system that receives the design file, the video referenced by the design file (or reference video) and personalized data, and applies the personalized data to the video based on instructions provided by the personalization elements in the design file. FIG. 5 illustrates one embodiment of personalization module 120. As shown in FIG. 5, personalization module 120 includes an extractor 510 that opens the design file and the referenced video file to extract a video frame associated with a time stamp personalization element in the design file (or optimal video frame (e.g., frame (n))). FIG. 6A illustrates an embodiment of frame (n).

An image generator 520 subsequently applies personalized data to frame (n) based on the personalization elements in the design file in order to generate an output frame (or output image) for frame (n). The personalization data interacts with the background image frame in the manner set up in the design file. If the design sets up to emboss the personalization in the background, then an emboss effect is applied to the background based on the personalization content. The effect can be any number of personalizations that are available in the system. As a result, the personalized data is applied within an image layer (or boundary box) personalization element defined according to any indicated effects personalization elements.

Figure 6B:
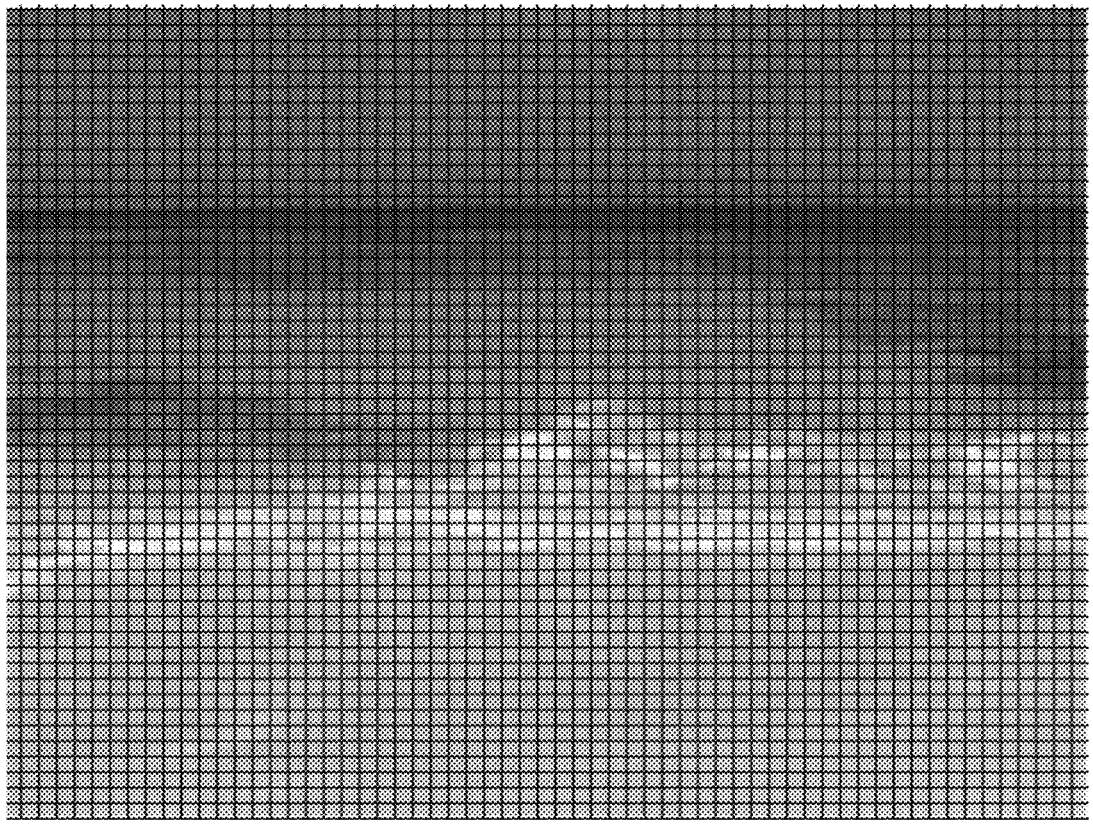

Image generator 520 then advances one frame forward to the subsequent frame (e.g., frame (n+1)) in the video (FIG. 6B), where frame comparator 530 performs a pixel by pixel comparison of frame (n) and frame (n+1) within an area corresponding to the boundary box in frame (n) to determine the pixels that are same between the two frames. In one embodiment, a pixel in frame (n+1) is considered the same upon a determination that the pixel is within a predetermined threshold of the corresponding pixel in frame (n). Image generator 520 subsequently applies the personalized data to frame (n+1). However, the output image for frame (n+1) is generated by applying the personalized data to only pixels that are determined by the comparison to be the same as the pixels in frame (n). Thus, the output image associated with frame (n+1) does not include personalized data at pixels in frame (n+1) determined to be different from pixels in the frame (n).

Figure 6C:
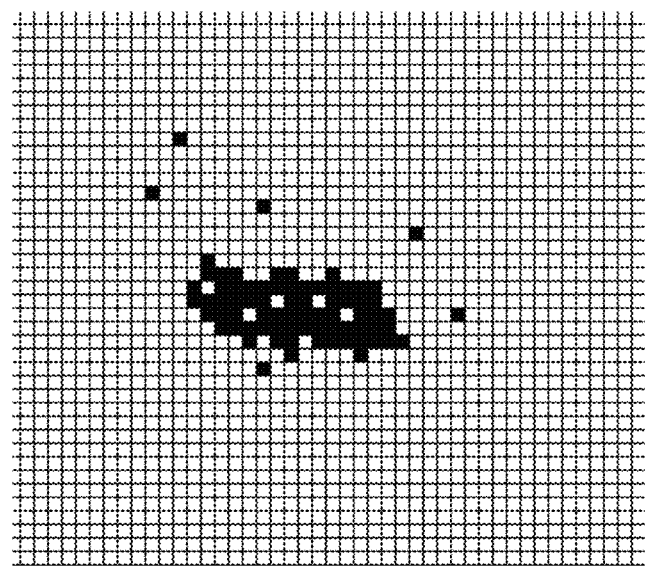
FIGS. 6C & 6D illustrate embodiments of masks.

According to one embodiment, a mask 540 is implemented to apply the personalized data to frame (n+1) to generate the output image for frame (n+1). In this embodiment, the mask indicates which pixels in frame (n+1) should be copied to the associated output frame. The mask is computed by the system, by comparing the source frame (n) to the subsequent source frame to determine which part of the original frame content is still present in the frame (n+1) being processed. If a portion of the original frame is obscured (such as by the ocean wave in our example) then the mask will remove that portion from the background. FIG. 6C illustrates an embodiment of the results of implementation of a mask 540. As shown in FIG. 6C, the mask includes artifacts. In an alternative embodiment, an alpha channel may be implemented. In such an embodiment, subsequent frame pixels that are sufficiently close to the original pixel could have their output color mixed with the original output color of the frame in the sample where the wave comes over the letters. This is because the sample lends itself to text fading in and out based on the wave. Further, a second pass is performed using a pixel weighting once a first pass is made with mask 540. The pixel is copied to the output image upon a determination that the pixel is surrounded, or mostly surrounded, by other pixels that are being copied to the output image.

Figure 6D:
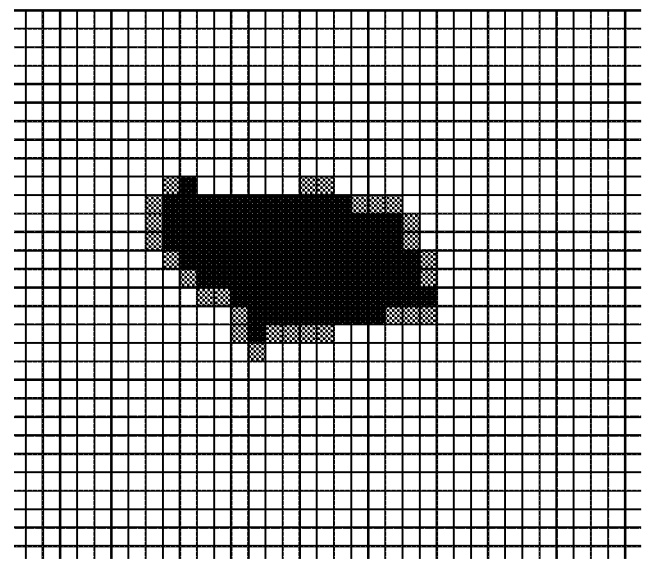

In a further embodiment, the mask for frame (n+1) is also compared against the mask from frame (n), removing differences from frame (n+1) to frame (n) for the personalized data that exceed a mask difference threshold. In this embodiment, the degree of variation between frames is dependent on the video. Thus, personalization module 120 may include an option to enable a user to adjust the mask difference threshold. Anti-aliasing logic 550 applies anti-aliasing to the edges of the mask to blur the edges so that there are no sharp delineations between the personalized data portion and the static portion. FIG. 6D illustrates an embodiment of the results of the mask after cleanup and anti-aliasing. If the alpha channel from step is not applied then the center of the mask is filled while the edges are partially transparent.

In one embodiment, the above-described process for generating the output image associated with frame (n+1) is repeated for all successive frames (e.g., frame (n+2), frame (n+3), etc.). In a further embodiment, the process is again repeated to generate output images associated with frames in the video preceding frame (n) (e.g., frame (n−1), frame (n−2), etc.). File generator 560 generates a video file including the generated output images. In one embodiment, the video file comprises an MP4 file.

Figure 7A:
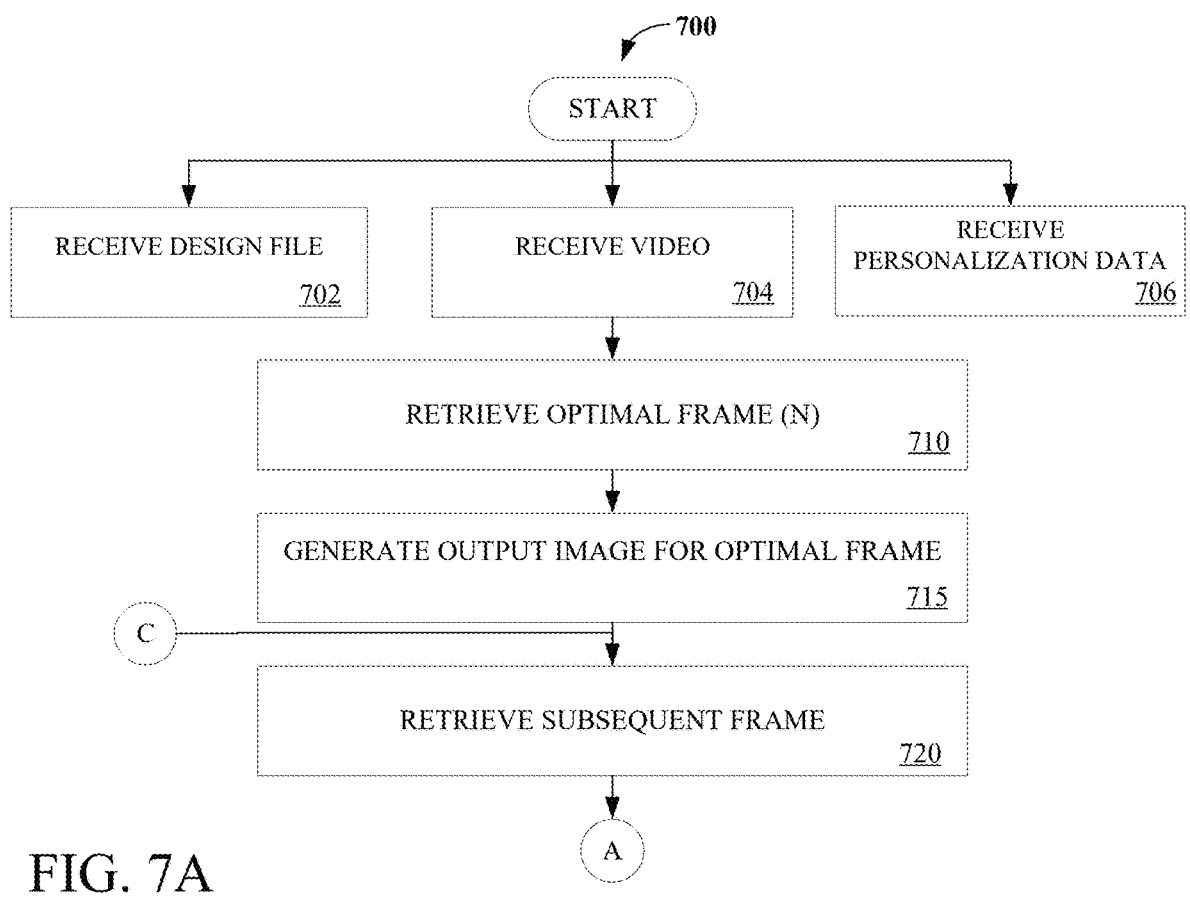
FIGS. 7A-7C is a flow diagram illustrating one embodiment of a video personalization process.
Figure 7B:
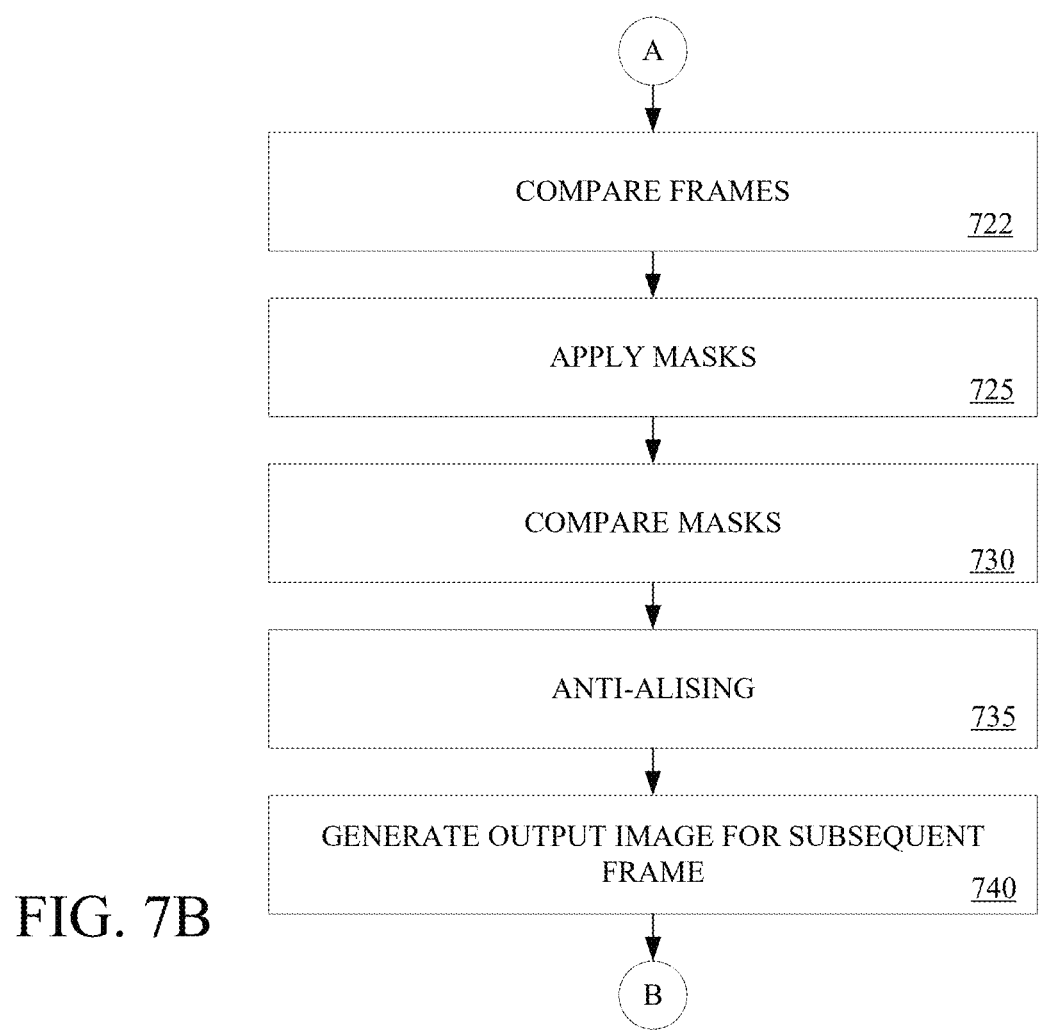
Figure 7C:
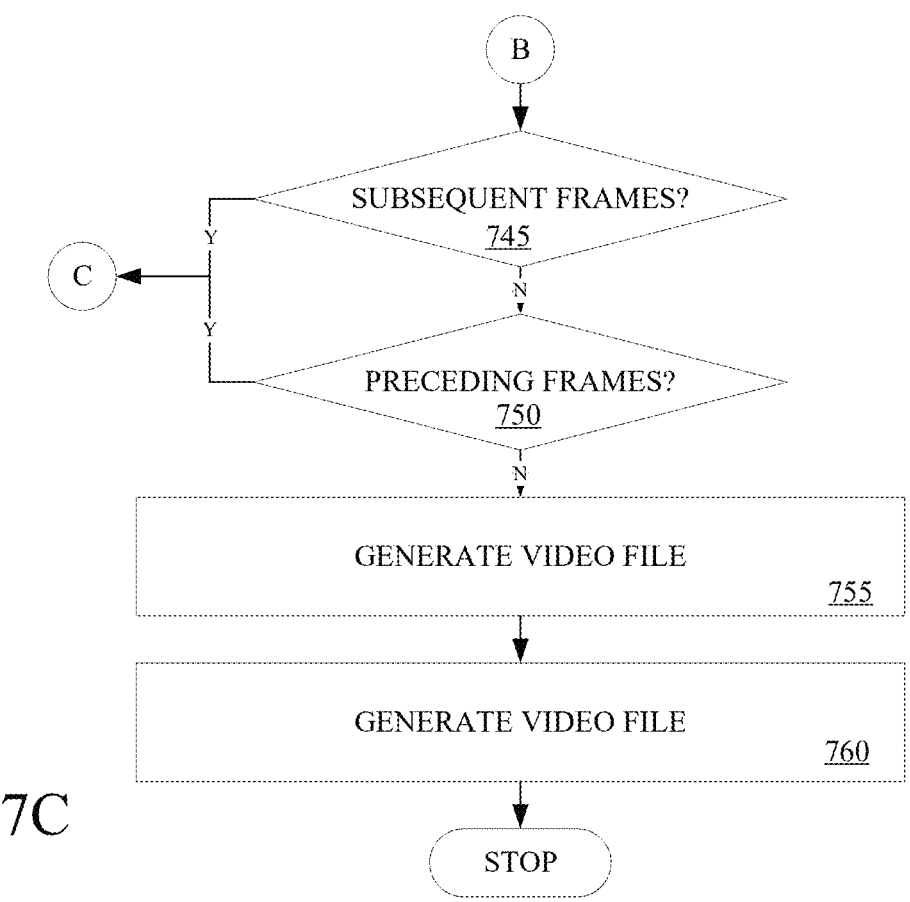

FIGS. 7A-7C is a flow diagram illustrating one embodiment of a process 700 for generating a video file including personalization content. Process 700 may be performed by processing logic that may comprise hardware (e.g., circuitry, dedicated logic, programmable logic, etc.), software (such as instructions run on a processing device), or a combination thereof. In one embodiment, process 700 may be performed by personalization module 120. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins at processing block 702, 704 and 706 (FIG. 7A), where a design file, reference video and personalized data, respectively, are received. At processing block 710, an optimal frame (e.g., frame (n)) is retrieved from the video. At processing block 715, an output image is generated for the optimal frame (e.g., by applying the personalized data to the optimal frame according to instructions provided by personalization elements in the design file. At processing block 720, a subsequent frame (e.g., frame (n+1) is retrieved from the video.

At processing block 722 (FIG. 7B), pixels in frame (n+1) are compared to pixels in frame (n) associated with the boundary box of frame (n) to determine pixels in the personalized data in frame (n+1) that are to be excluded from the output image associated with frame (n+1). At processing block 725, masks are generated for the pixels of frame (n) and for the pixels of frame (n+1) at an area corresponding to the boundary box. At processing block 730, the masks are compared to determine whether there are significant in frame (n+1) from frame (n). At processing block 735, anti-aliasing is performed on the edges of the masks. At processing block 740, the output image is generated for frame (n+1).

At decision block 745 (FIG. 7C), a determination is made as to whether there are any subsequent frames to process. If so, control is returned to processing block 720, where a subsequent frame (e.g., frame (n+2)) is retrieved. Otherwise, a determination is made as to whether there is a frame preceding frame (n) (e.g., frame (n−1)) that is to be processed, decision block 750. If so, control is again returned to processing block 720, where a subsequent frame is retrieved. If not, a video file including the generated output images included the personalization content is generated, processing block 755. At processing block 760, the video file is stored (e.g., in content database 130). However, in other embodiments the video file may be transmitted to another computer system for storage.

According to one embodiment, the optimal frame, represented by frame (n), may be selected by a user. In such an embodiment, the user may set multiple key frames in the same personalization element (e.g., such that there would be more than one frame (n) in the same sequence in order to smooth out the composition) upon a determination that the effect of the system is not desirable. In a further embodiment, the user may apply sample personalized text to the system in the design tool to view feedback of one or more selections in order to adjust the settings in the system. In such an embodiment, the design is transmitted to a server where a batch of personalization data is entered into the system; thus generating an output personalized video for each data set.

The above embodiments describe a basic personalization system in which personalized components of the video do not move within the frame, but are obscured and revealed as the video plays. However other embodiments may feature the personalized video to move within the frame. In a kite video, for example, a personalized message may appear in the sky in which a kite floats around a frame causing the camera to move to track the kite. As the camera moves, the personalization module 120 may detect shifting of the video and move the personalized image appropriately. In this embodiment, the content of the personalization boundary box would be static, with only its position shifting. However, neither the point of view toward the personalized data (e.g., the vantage point from the user looking up at the sky) nor the lighting changes.

Figure 8:
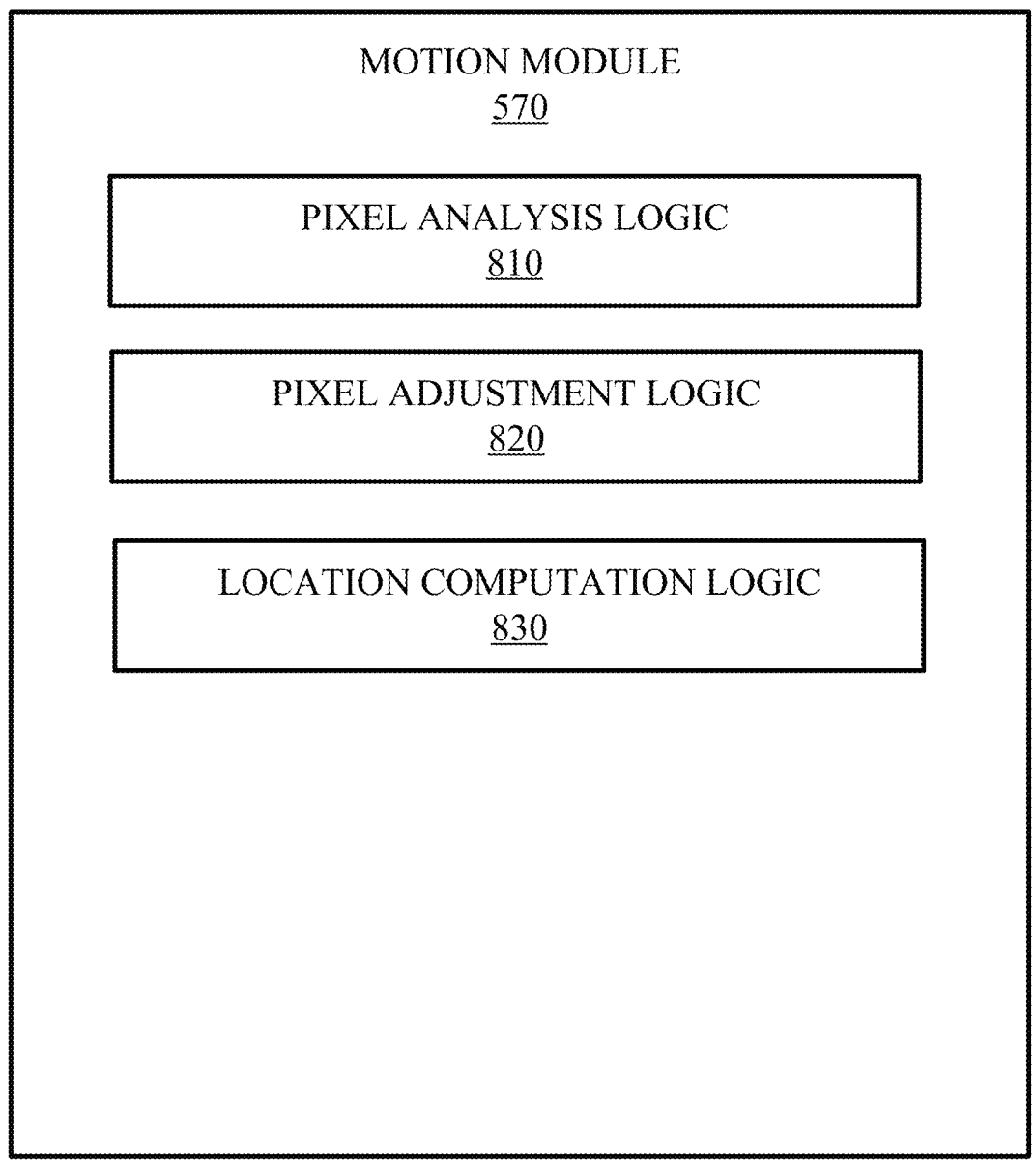
FIG. 8 illustrates one embodiment of a motion module.

According to one embodiment, personalization module 120 includes a motion module 570 to adjust the position of the personalized component relative to the background. FIG. 8 illustrates one embodiment of a motion module 570 including pixel analysis logic 810 and pixel adjustment logic 820. Pixel analysis logic 810 locates an area within the optimal frame (e.g., frame (n+1)) to use as a landmark. In one embodiment, pixel analysis logic 810 locates the landmark by scanning the optimal frame and finding the set of pixels (or reference frame) that is most significantly different from its surrounding pixels. This may be a cloud or perhaps a building that is in the background in the kite example mentioned above. In this embodiment, the pixel analysis occurs after receiving the optimal frame and prior to generating the output image for the optimal frame (e.g., between processing blocks 710 and 715 in process 700).

Pixel adjustment logic 820 adjusts the position of the boundary box personalization element within each frame based on the reference frame. In one embodiment, the adjustment is performed based on the location of the reference frame in a subsequent frame and the location of the reference frame in the optimal frame. For example, the location of the boundary box in frame (n+1) is adjusted a distance and direction from the boundary box in frame (n) based on the distance and direction of the reference frame in the respective frames has been displaced from frame (n) to frame (n+1). In this embodiment, the adjustment process is performed upon receiving a subsequent frame (e.g., processing block 720 in process 700). The result of the motion module 570 implementation results in personalized data included in the boundary box appearing at different positions within the output image associated with frame (n) and the output image associated with frame (n+1).

In a further embodiment, personalization module 120 enables the following of moving objects that are personalized. For example, a moving object may include a person carrying a box with a name printed on the side. In this example, the box would be jostled and rotated, perhaps into and out of the frame. In another example, a Do Not Disturb sign is placed on a doorknob and sways back and forth. For this example, a personalized message may swing with the sign, possibly into and out of shadow. Additionally, the message might be written in cloth or paper which is bent or crumpled up.

According to one embodiment, GUI 220 within content editor 110 provides a grid that indicates a shape of an object to be processed at personalization module 120. In such an embodiment, the grid is drawn on multiple frames to indicate the movement of the personalized object between frames. In a further embodiment, a key frame system may be employed to enable a user to mark only the transition points (e.g., one set of points when the sign changes direction on each swing). In such an embodiment, a keyframe personalization element is generated including keyframe information.

Motion module 570 includes location computation logic 830 to receive the keyframe personalization element and process the keyframe information to compute a new location of the boundary box personalization element within a moving object within each frame. In one embodiment, location computation logic 830 computes the location by extrapolating the position of the boundary box personalization element position based on the key frames. In this embodiment, the personalization component includes similar graphic content behind it, and thus only needs to apply appropriate transformations between the frames. In a further embodiment, location computation logic 830 processes each key frame as a new optimal frame, applies transitions between the optimal frames, and applies the transformation matrix to the personalization frame image.

The transitions may take the form of merging the differences between two abutting image streams that are in the same sequence but have different optimal image frames. If the first optimal image frame has a sequence of differences between frame (n) to frame (n+x) and the second optimal image frame (e.g., frame (n2)), is in a sequence that begins at frame (n2−y), then frame (n+x) and frame (n2−y) will be the same frame. Accordingly, the personalization applied to that frame is the averaging of the images created by the personalization between the two frames. That is, pixel by pixel the system applies averaging and antialiasing to the pixels that have personalization elements between the two frames. In some embodiments, there will be a number of frames that overlap, that the user may specify in content editor 110 to achieve optimal performance.

In the case of personalizations that move over the frame, such as a swinging sign on a door, the personalization frame is animated in content editor 110 to indicate the start point and end point in key frames and the degree of rotation at the key frames. Personalization module 120 computes the rotation angle at each frame along the timeline, applying a rotation transform as one who is skilled in the art would apply.

In a further embodiment, a lighting personalization element is provided to indicate that the background frame has not changed. The color difference of the background elements surrounding the personalization element indicates the kind of light/color change that is occurring. Location computation logic 830 uses the information to apply the same color shift to the image generated by the personalization element.

Figure 9:
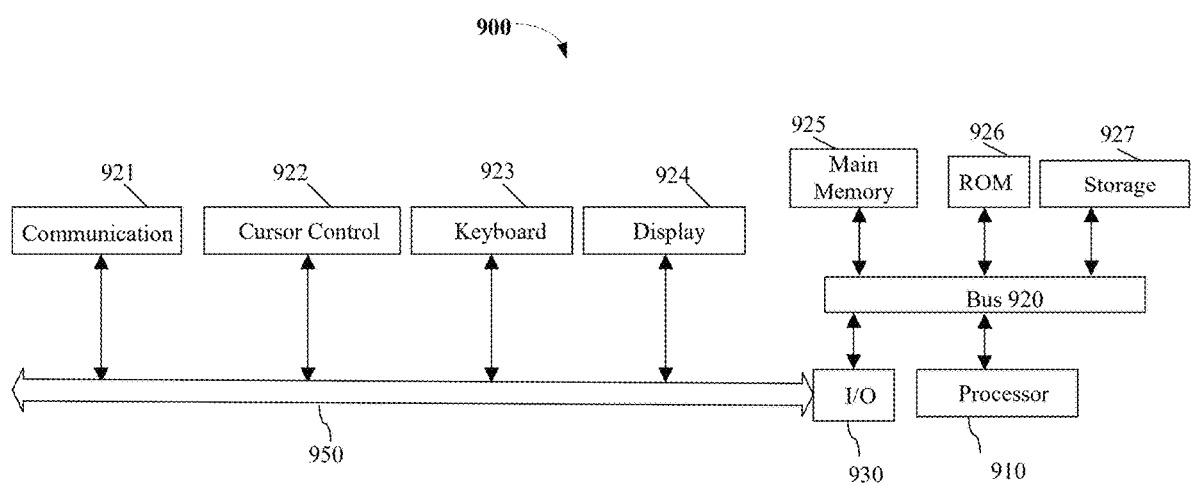
FIG. 9 illustrates a computing device suitable for implementing embodiments of the present disclosure.

FIG. 9 illustrates a computer system 900 on which personalized video system 100, computing system 150 and/or computing system 160 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A video processing system comprising:
   one or more processors to:
   retrieve a first video frame from a reference video based on a design file comprising one or more personalization elements;
   locate a landmark area at a first position within the first video frame;
   apply personalized data at a first location in the first video frame within a boundary box personalization element included in the design file to generate a first output image;
   retrieve a second video frame from the reference video;
   adjust a position of the boundary box personalization element in the second video frame to a second location based on a location of the landmark in the second video frame;
   apply the personalized data within the boundary box personalization element at the second location in the second video frame to generate a second output image; and
   generate a video file comprising the first output image and the second output image.

2. The system of claim 1, wherein the one or more processors locating the landmark comprises finding a reference frame within the first video frame.

3. The system of claim 2, wherein the reference frame comprises a set of pixels that is most different from its surrounding pixels in the first video frame.

4. The system of claim 2, wherein the location of the landmark area is different in the second video frame than in the first video frame.

5. The system of claim 1, wherein the location of the boundary box personalization element in the second video frame is adjusted a distance and direction from the boundary box personalization element in the first video frame based on a distance and direction the reference frame has been displaced from the first video frame to the second video frame.

6. The system of claim 1, wherein the one or more personalization elements within the design file provide instructions as to how the personalized data is to be applied to the reference video.

7. The system of claim 1, wherein the one or more processors receive a key frame personalization element included in the design file to:
   compute a first location of the boundary box personalization element in the first video frame based on key frame information included in the key frame personalization element; and
   compute a second location of the boundary box personalization element in the second video frame based on the key frame personalization element.

8. The system of claim 1, wherein the one or more processors to retrieve the first frame based on a time stamp personalization element included in the design file.

9. The system of claim 1, wherein personalized data associated with the one or more personalization elements comprises variable content data that is customized to an individual viewing the video at a client system.

10. A method comprising:
    retrieving a first video frame from a reference video based on a design file comprising one or more personalization elements;
    locating a landmark area at a first position within the first video frame;
    applying personalized data at a first location in the first video frame within a boundary box personalization element included in the design file to generate a first output image;
    retrieving a second video frame from the reference video;
    adjusting a position of the boundary box personalization element in the second video frame to a second location based on a location of the landmark in the second video frame;
    applying the personalized data within the boundary box personalization element at the second location in the second video frame to generate a second output image; and
    generating a video file comprising the first output image and the second output image.

11. The method of claim 10, wherein locating the landmark comprises finding a reference frame within the first video frame.

12. The method of claim 11, wherein the reference frame comprises a set of pixels that is most different from its surrounding pixels in the first video frame.

13. The method of claim 12, wherein the location of the landmark area is different in the second video frame than in the first video frame.

14. The method of claim 10, wherein the location of the boundary box personalization element in the second video frame is adjusted a distance and direction from the boundary box personalization element in the first video frame based on a distance and direction the reference frame has been displaced from the first video frame to the second video frame.

15. The method of claim 10, wherein the one or more personalization elements within the design file provide instructions as to how the personalized data is to be applied to the reference video.

16. At least one non-transitory computer readable medium having instructions stored thereon, which when executed by one or more processors, cause the processors to:
 retrieve a first video frame from a reference video based on a design file comprising one or more personalization elements;
 locate a landmark area at a first position within the first video frame;
 apply personalized data at a first location in the first video frame within a boundary box personalization element included in the design file to generate a first output image;
 retrieve a second video frame from the reference video;
 adjust a position of the boundary box personalization element in the second video frame to a second location based on a location of the landmark in the second video frame;
 apply the personalized data within the boundary box personalization element at the second location in the second video frame to generate a second output image; and
 generate a video file comprising the first output image and the second output image.

17. The computer readable medium of claim 16, wherein the one or more processors locating the landmark comprises finding a reference frame within the first video frame.

18. The computer readable medium of claim 17, wherein the reference frame comprises a set of pixels that is most different from its surrounding pixels in the first video frame.

19. The computer readable medium of claim 18, wherein the location of the landmark area is different in the second video frame than in the first video frame.

20. The computer readable medium of claim 16, wherein the location of the boundary box personalization element in the second video frame is adjusted a distance and direction from the boundary box personalization element in the first video frame based on a distance and direction the reference frame has been displaced from the first video frame to the second video frame.

* * * * *